Nov. 17, 1931.   W. F. OLIVER   1,832,135
SEMIRIGID BRAKE SHOE
Filed June 4, 1928   2 Sheets-Sheet 2
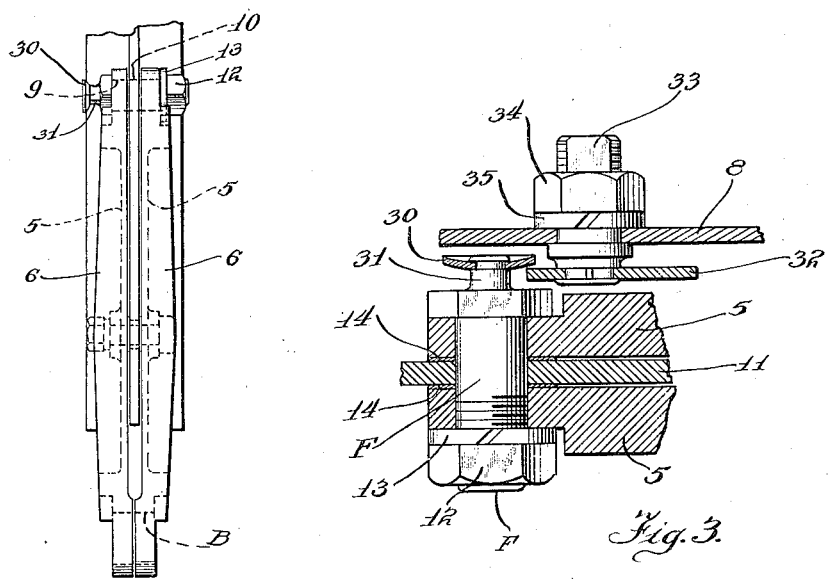
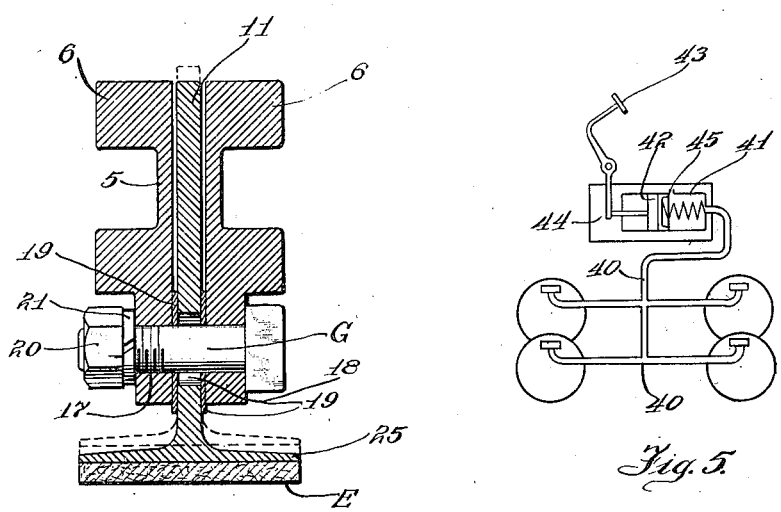
Inventor
Wallace F. Oliver Patented Nov. 17, 1931

1,832,135

UNITED STATES PATENT OFFICE

WALLACE F. OLIVER, OF DETROIT, MICHIGAN, ASSIGNOR TO HYDRAULIC BRAKE COMPANY, OF LOS ANGELES, CALIFORNIA, A CORPORATION OF CALIFORNIA

SEMIRIGID BRAKE SHOE     REISSUED

Application filed June 4, 1928. Serial No. 282,661.

My invention relates to improvements in semi-rigid brake shoes.

The invention will be explained as embodied in that type of brake shoe employed in the brake assembly of an internal expanding brake mechanism.

An object of the invention is to provide an improved semi-rigid brake shoe.

A further object is to provide a semi-rigid brake shoe in which that part bearing the brake lining is forced into uniform engagement with the brake drum by means independent of the brake shoe applying mechanism and thereupon set to normally maintain complete and uniform engagement of the shoe with the drum throughout the length of its entire brake lining surface.

Another object is to provide a semi-rigid brake shoe in which a part of the adjusting mechanism performs the two-fold function of causing the flexible part of the brake shoe to conform with the contour of the brake drum during adjustment and which also serves as a limiting stop for the shoes when released from engagement with the drum as during use.

Another object is to provide a semi-rigid brake shoe of the articulated type, wherein under normal conditions the heel portion of the shoe is rendered substantially rigid and the toe portion relatively flexible and the entire work-engaging portion of the shoe subject to flexibility during adjustment. Where the expression "flexible brake shoe" is used herein this expression is to be interpreted as meaning a brake shoe which will flex very slightly under operating pressures.

A further object is to provide a semi-rigid brake shoe of the articulated type having a rigid supporting part and a relatively flexible work-engaging part associated with one another in such a manner as to permit relative flexibility of the toe of the shoe, yet retain rigidity at the heel portion.

A further object is to provide a semi-rigid brake shoe which is extremely simple in construction which may be readily assembled and disassembled and in which the relatively flexible part may be removed without disengaging the shoe from its pivotal mounting in the brake assembly.

Other objects and advantages will be more particularly pointed out in the following specification and appended claims.

In the invention, as illustrated in the accompanying drawings forming a part of this application:

Figure 2 is a view along the line 2—2 of Figure 1;

Figure 3 is an enlarged sectional view along the line 3—3 of Figure 1;

Figure 4 is an enlarged sectional view along the line 4—4 of Figure 1; and

Figure 5 is a diagrammatic view illustrating the manner in which the wheel cylinders of the hydraulic brake system are actuated.

Figure 1:
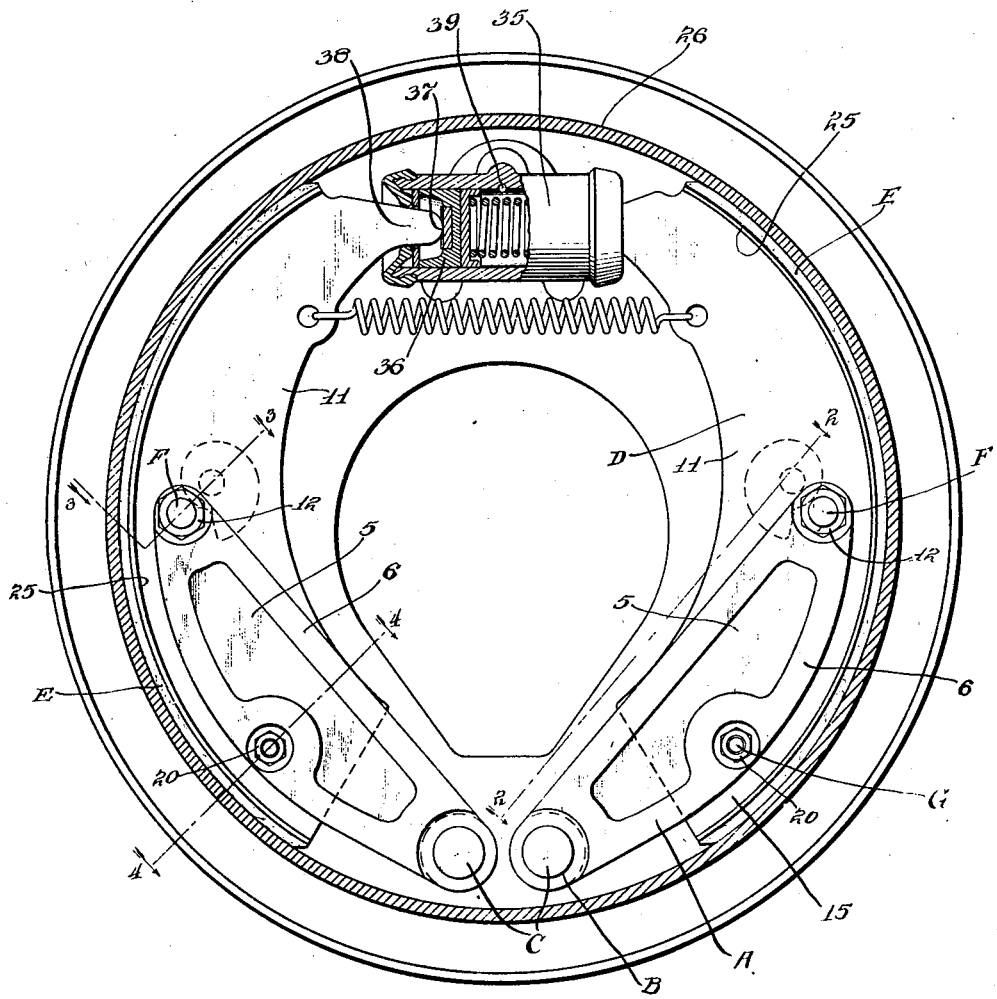
Figure 1 is a side elevation, a part thereof in section of an internal expanding brake assembly showing the semi-rigid shoe in use.

In general, the semi-rigid brake shoe consists in substantially rigid two-part supporting member A having a bearing portion B for pivotal engagement with a mounting pin C, a relatively flexible member D supporting a brake lining E pivotally secured at F to support member A and retained against movement thereto at the heel part by an adjustment and locking bolt G.

The supporting member A consists (see Fig. 2) of a complementary pair of malleable metal plates 5 heavily reinforced by rib portions 6 extending laterally from the peripheral portions of the plates. Registering bearing portions B are formed in the plates to receive the brake shoe mounting pin C. In a complete brake assembly there are two such pins rigidly secured to the rear cover or dust plate 8 of the assembly.

Registering bores 9 are provided in the upper ends of plates 5 for receiving the bolt F, which extends through an opening 10 formed in the web portion 11 of the relatively flexible member D, thus the member D is pivotally supported upon the support member A, which in turn is pivotally supported upon mounting pin C. Bolt F has a nut 12 and lock washer 13 by means of which plates 5 are drawn toward one another and tightly clamp web 11 thereto. Small metal washers 14 are disposed on bolt F, one on each side of web 11, so that the web does not contact with plates 5 at any point throughout its disposition between the plates.

Means for securely locking the heel portion 15 of flexible member D to the rigid member A and for permitting adjustment of member D upon its pivotal support F, consists in bolt G which extends through alined openings 17 provided in plates 5 and through an elongated slot 18 in the web portion 11 of member D. The longitudinal axis of slot 18 is substantially concentric with bolt F. As in the case of bolt F, a pair of small washers 19 are disposed one on each side of web 11 upon bolt G. A nut 20 and lock washer 21 are provided for bolt G, so that web 11 may be securely bound between plates 5 at bolt G.

The relatively flexible member D has an integral flange 25 at its peripheral edge for supporting a brake lining E and therefore lies in a plane concentric with the brake drum 26 of the wheel assembly.

The inner end of bolt F carries a concave disc 30 secured to an inwardly extending pillar 31 which cooperates with an adjustable cam 32 carried by threaded shaft 33 mounted and extending through cover 8 for limiting lateral movement of the shoe and for limiting the retractile movement of the shoe away from brake drum 26. A lock nut 34 and lock washer 35 are provided for shaft 33 to set the shaft against movement when adjusted.

In the drawings I have illustrated a hydraulic actuating means for the brake shoes, though the shoes herein described may be actuated with equal success by any one of the several well known brake shoe actuating systems.

With reference to Figures 1 and 5, a wheel cylinder 35 is mounted within brake drum 26 and has a pair of opposed pistons 36 therein, each of which engage at 37 with integral tongues 38 formed in members D. Fluid under pressure is admitted to cylinder 35 through a passage 39 communicating with fluid ducts 40. The fluid ducts 40 are connected with a master cylinder 41 having a master piston 42 which is actuated by manual manipulation of a foot pedal 43. The reserve supply of fluid is maintained in a reservoir 44 communicating at 45 with a master cylinder 41 at such times as when the piston 42 is in its full retractile position.

In operation my improved semi-rigid brake shoe is adjusted to conformity with the brake drum by first releasing nut 20 so that the flexible member D of the shoe is free to pivot upon bolt F. At this time and during the entire adjustment of the brake shoe, fluid pressure in the wheel cylinder 35 is released.

Nut 34 is next released and the shaft 33 rotated with a wrench or special tool provided for that purpose to cause the cam 32 to turn therewith and force bolt F toward the brake drum 26. This causes the flexible part D of the shoe to be forced into conformity with the curvature of the brake drum, the application of force being at the midpoint of the flexible part. During this operation web 11 will shift upon its pivotal support bolt F with respect to the rigid supporting member A which is possible by virtue of the elongated slot 18 formed in the web through which bolt G extends. While the parts are thus positioned nut 20 is turned down tightly so as to draw the two malleable plates 5 toward one another and securely bind and lock the inner or heel end of the flexible part D to and against movement with respect to rigid supporting member A at that portion surrounding bolt G.

The adjusting cam 32 is then moved in a counter-clockwise direction (Fig. 1) until the proper clearance has been established between the brake drum 26 and the surface of the brake lining E whereupon the nut 34 is tightened so as to maintain the adjusting cam 32 in proper position to establish the desired clearance between shoe and drum.

In use the heel part, i. e. that part of the shoe between bolt F and that end adjacent to the pivotal shoe mounting C, presents a substantially rigid brake drum engaging element, whereas that part of the shoe between bolt F and the tongues 38 is relatively flexible. This condition assures proper engagement of the shoe with the drum by permitting somewhat greater application of pressure to the drum by the shoe at its toe or forward end, to cause the building up of a wrapping effect between drum and shoe in that shoe having its toe pointing in a direction opposite to the direction of the rotation of the drum. The anchoring of the parts D to the rigid support A does not destroy the relatively flexible properties of the parts D because there is a space between the components 5 of the rigid support A and the web 11 of the parts D except for that area immediately surrounding bolts F and G.

What I claim as new and desire to secure by Letters Patent of the United States is:

1. In a vehicle wheel brake, a brake drum, a pivotally mounted rigid member, a relatively flexible brake lining support pivoted intermediate its length to the free end of the rigid member, a cam for forcing the flexible support into close engagement with the brake drum and means for securing the flexible support to the rigid member at a point adjacent to the inner end of the flexible member whereby the innermost part of the flexible member is rendered relatively rigid and the outer end may remain relatively flexible.

2. In a vehicle wheel brake, a brake drum, a pivotally mounted rigid member, a relatively flexible brake lining support pivoted intermediate its length to the free end of the rigid member, a cam for forcing the flexible support into close engagement with the brake drum and means for securing the flexible support to the rigid member at a point adjacent to the inner end of the flexible member whereby the innermost part of the flexible member is rendered relatively rigid and the outer end may remain relatively flexible, said cam further serving as a stop to limit the movement of the flexible support away from the drum.

3. In a vehicle wheel brake, a brake drum, a mounting pin, a rigid plate pivotally supported upon the mounting pin, a relatively flexible brake lining support pivotally mounted at a point intermediate its length to the free end of the plate, a cam for exerting outward radial pressure to the flexible support at its point of connection with the plate to force the support into conformity with the curvature of the drum, and means for locking the inner end of the flexible support against movement with respect to the plate while the flexible support is so forced against the drum.

4. In a vehicle wheel brake, a semi-rigid brake shoe comprising a rigid member forming the heel portion of the shoe, a relatively flexible brake lining support, in circumferential alignment with the rigid member and overlapping the rigid member, a pivotal connection between the outer end of the rigid member and the adjacent part of the flexible support, and adjustable means for locking the inner end of the flexible support to the adjacent part or the rigid member, whereby the heel portion of the flexible support is relatively unyielding and the remaining portion is relatively flexible.

5. In a vehicle wheel brake, a semi-rigid brake shoe comprising a rigid member forming the heel portion of the shoe, a relatively flexible brake lining support, in circumferential alignment with the rigid member and overlapping the rigid member, a pivotal connection between the outer end of the rigid member and the adjacent part of the flexible support, and adjustable means for locking the inner end of the flexible support to the adjacent part of the rigid member, that portion of the flexible support lying between the said pivotal connection and the said adjustable means being free of contact with the flexible support whereby the heel portion of the flexible support is relatively unyielding and the remaining portion is relatively flexible.

6. In a vehicle brake, a brake drum, a relatively flexible brake lining support, operating means for applying pressure adjacent one end of the flexible support to cause the support to adjust itself to the curvature of the brake drum, rigid means for locking only that portion of the flexible support remote from said operating means in adjusted position, and means associated with said rigid means for pivotally mounting the flexible support within the drum.

In witness whereof, I hereunto subscribe my name this 29 day of May, 1928.

WALLACE F. OLIVER.